United States Patent [19]
Carson

[11] 3,952,908
[45] Apr. 27, 1976

[54] METER BOX AND COVER

[76] Inventor: John Reese Carson, Chapman Woods Road, Pasadena, Calif. 91107

[22] Filed: Aug. 1, 1975

[21] Appl. No.: 601,047

[52] U.S. Cl. ................................. 220/18; 220/3.8; 220/337
[51] Int. Cl.² ...................................... B65D 25/24
[58] Field of Search ............... 220/18, 3.2, 3.8, 334, 220/337

[56] References Cited
UNITED STATES PATENTS

| | | | |
|---|---|---|---|
| 3,131,512 | 5/1964 | MacLeod, Jr. | 220/3.8 X |
| 3,858,755 | 1/1975 | Tellen | 220/337 X |

Primary Examiner—William Price
Assistant Examiner—Steven M. Pollard
Attorney, Agent, or Firm—Spensley, Horn & Lubitz

[57] ABSTRACT

A meter box and a uniquely designed cover molded out of a substantially rigid plastic material is disclosed.

The meter box comprises an open upper top with an upwardly extending rim member terminating on the inside surface thereof in an inwardly extending ledge member. Disposed above the ledge member of the meter box are a plurality of outwardly extending slots or grooves which enable the cover to be selectively inter-connected to the meter box. The cover is arranged and configured to rest on the ledge confronting the rim of the box so as to substantially close the open top of the box.

The cover comprises first and second sections and means for rotatably joining the first and second sections together. The first section has outwardly extending protrusions which engage the outwardly extending slots on the meter box so as to render the first section substantially immovable therein. The second section has means, such as, for example, an opening, which enable the user to lift the second section off the top of the meter box and move it about the rotation means whereby the meter box is selectively opened and closed. The meter box and cover of the present invention have particular utility because of the ease of construction, and beneficial cost versus strength ratios.

13 Claims, 6 Drawing Figures

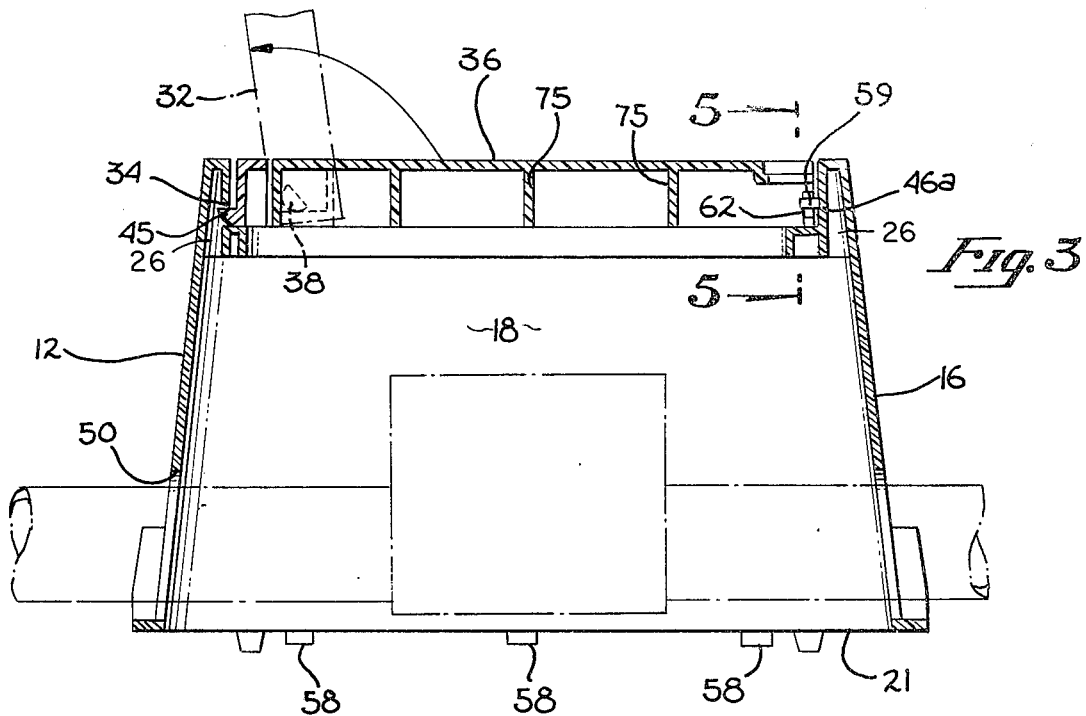
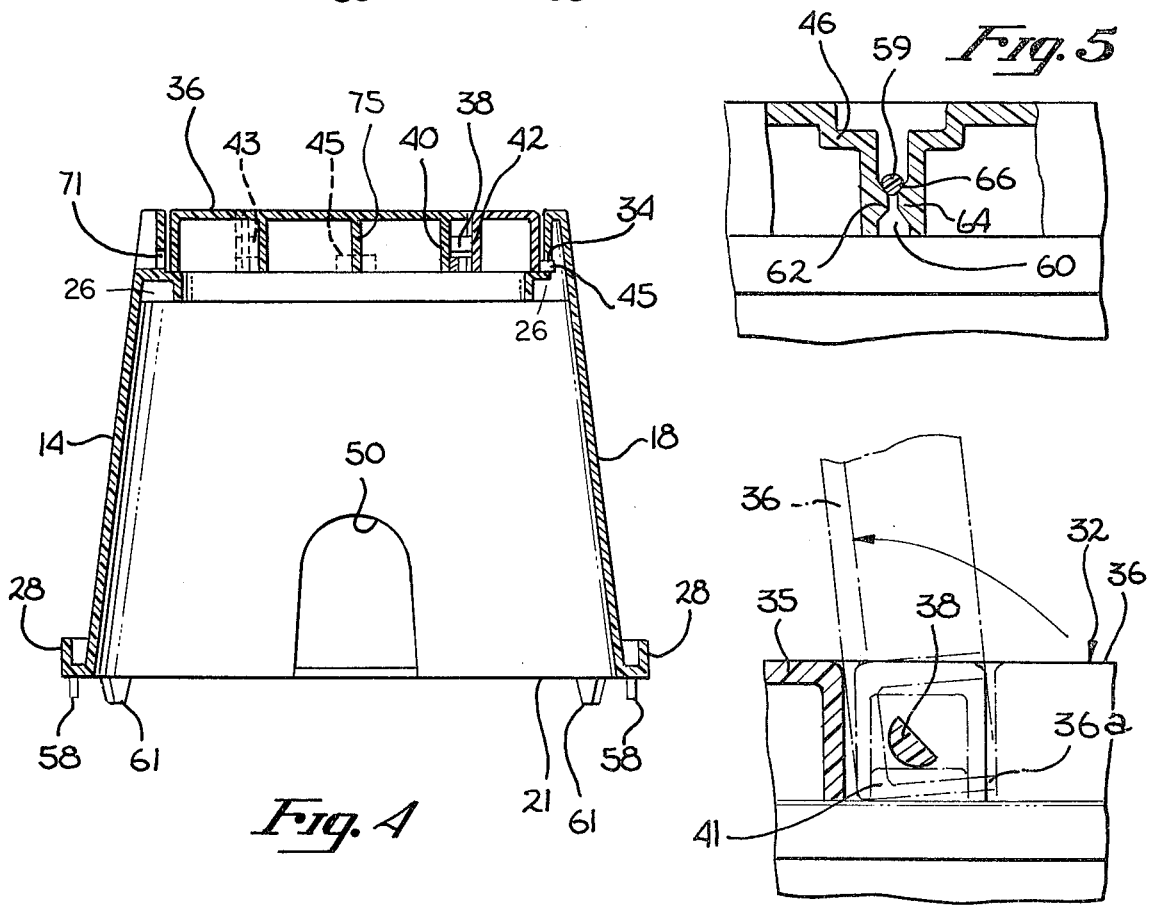

METER BOX AND COVER

BACKGROUND OF THE INVENTION

1. Field of the Invention

This invention relates to the field of containers which can be set in the ground for enclosing pump regulators and the like, and more specifically, to a meter box and cover having unique design aspects.

2. Prior Art

Meter boxes are well known in the art and are generally made of molded concrete with a fitted concrete or metal cover. These type of meter boxes suffer the obvious shortcomings in that they are heavy, and are susceptible to damage. Moreover, the covers are also difficult to use in that the cover must usually be completely removed in order to gain entry into the box. The cover, being a separable unit, may be misplaced at the job site necessitating the user to replace the cover with a new one. In addition, vandals can remove such covers or carry away a cover that the user failed to replace on the box. This leaves the contents of the box exposed; a potentially dangerous situation.

Many improvements have been made to this form of meter box an example of which is disclosed by Brooks. U.S. Pat. No. 3,843,013. Brooks shows a meter box moulded out of a fibrous plastic material which has a substantially rigid plastic cover held by a ledge in the meter box. In order to open the box of Brooks, the first embodiment discloses the use of a tool which is inserted into the cover and bent inwardly, thereby causing the rigid cover to yieldably disengage from the box.

This assembly also contains a number of obvious shortcomings discussed with reference to concrete meter boxes. For example, the meter box of Brooks still requires the user to completely remove the cover before access into the box is possible. Again, the propensity for loss and/or theft of the cover, as well as damage to the contents of the box, is possible. In utilizing the box of Brooks, each time the box is to be opened, substantial inward-directed force must be applied to flexible members in order to get them to pivotably rotate a substantial distance so as to disengage the cover from the box.

In a second embodiment of Brooks, a relatively complicated spring and latch system and associated tool means is also disclosed. Under the first method used to open the box, the force that was needed to flex the inter-locking members may weaken these members and therefore render such a cover susceptible to easy and quick deterioration. In the latter alternative, the expense of a spring actuated locking system substantially increases the cost of such a meter box. Finally, the meter box of Brooks contains various engaging and opening means which are of complicated design and therefore increase the cost of construction of such a box.

Thus, the prior art assemblies are either made of concrete and are extremely heavy and susceptible to damage due to dropping and the like or are made of plastic, but contain members which are expensive to make and susceptible to easy deterioration. In addition, the problem of complete removal of the meter cover remains.

The present invention provides a meter box and associated cover which are easy to install and use, and which contain none of the shortcomings of the prior art. Because the meter box of the present invention is relatively straight forward and simple to make, it is not susceptible to the problem of excessive wear and tear and it is relatively inexpensive to produce. The meter box of the instant invention has a uniquely designed cover which does not require its complete removal in order to gain entry into the box. Thus, the above identified problem of the cover associated with the prior art boxes is overcome.

SUMMARY OF THE INVENTION

A meter box and cover is described which is light weight and strong, but which can be set in the ground in a manner of a concrete box and used to protect pipes, pipe meters and the like found therein. This invention comprises:

i. A meter box having first and second ends and an open upper top with an upwardly extending rim member terminating on the inside surface thereof and an inwardly extending ledge member. The meter box has a plurality of slots disposed on the inside surface above the ledge member adjacent the first end thereof. The bottom of the meter box has an outwardly extending ledge member along the bottom thereof which helps to stabilize the box when disposed in the ground. While the box may take on a number of different configurations, the sides of the box are tapered from a larger end adjacent to the bottom of the box to a narrower end adjacent to the top of the box. This tapering prevents the box, once it is in place in the ground, from being removed without also removing a large quantity of the dirt or concrete in which the box is disposed. Thus the box, because of the tapered sides, is rendered substantially immovable and is not easily dislocated from its predetermined position once in place; and ii. A cover having a downwardly extending flange member arranged and configured so as to rest on the ledge member and confront the rim on the box. The cover comprises first and second sections and pin means for rotatably joining the first and second sections together. The first section is coupled to the first end of the meter box by a plurality of protrusions which are yieldably engaged in the slots in the meter box so as to render the first section substantially immovable therein. The second section is coupled to the second end of the box and has means for lifting the second section off the meter box top and moving it about the pin means whereby the meter box is selectively opened and closed.

It is therefore one object of the present invention to provide a meter box having a cover which is light weight, yet relatively inexpensive and easy to produce.

Yet another object of the present invention is to provide a meter box which is easily openable without need for any special tools or equipment.

Yet a further object of the present invention is to provide a meter box and interlocking cover, which cover may be selectively opened and closed to expose the contents of the box without requiring the complete removal of the cover off the top of the box.

The novel features which are believed to be characteristic of this invention, both as to its organization and method of operation, together with the further objectives and advantages thereof, will be better understood from the following description considered in connection with accompanying drawings in which a presently preferred embodiment of the invention is illustrated by way of example. It is to be expressly understood, however, that the drawings are for the purpose of illustration and description only and not intended as a definition of the limits of the invention.

BRIEF DESCRIPTION OF THE DRAWINGS

FIG. 3 is a fragmentary sectional view taken through lines 3—3 of FIG. 2 showing the means used to selectively join the first end of the cover to the meter box, as well as the means used for coupling the second end of the cover to the meter box.

FIG. 4 is a fragmentary sectional view taken through lines 4—4 of FIG. 2 showing the means used to rotatably join the first and second sections of the cover together.

FIG. 5 is a sectional view taken through lines 5—5 of FIG. 3 showing the means used to join the second section of the cover to the meter box such that the cover is held in place, but which is relatively easy to open without the need for any uniquely designed tool or other instrument.

FIG. 6 is a sectional view taken through lines 6—6 of FIG. 3 showing the pin means used to rotatably join the first and second sections of the cover together.

DETAILED DESCRIPTION OF THE INVENTION

Figure 1:
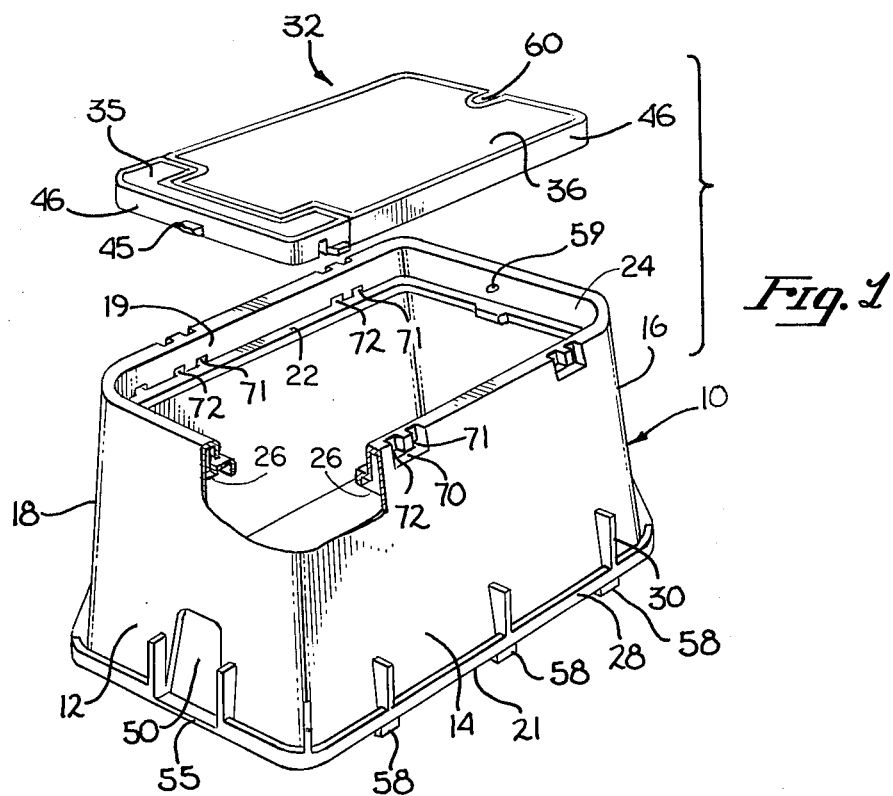
FIG. 1 is an exploded perspective view of the meter box and cover of the present invention showing the two part cover and how it is disposed within the peripheral rim of the meter box.

Referring first to FIG. 1, there is shown, as a presently preferred embodiment, a meter box 10 having sides members 12, 14, 16 and 18, arranged and configured to form a basically complete generally rectangular structure having open top end 19 and an open bottom 21. The open top 19 of the box 10 is provided with an inwardly extending peripheral ledge 22 joined to an upwardly extending rim 24. Rim 24, in the presently preferred embodiment is a continuation of each of the respective sides of the box 10. Note that rim 24 and the sides of the box 10 are one continuous discrete molded section which has a generally smooth appearance and simple design. This permits the molding techniques to make the box 10 of the invention quickly and at a relatively low cost. One can see in this figure that ledge member 22 extends inward towards the center of the box 10 and is preferably supported by a plurality of supporting rib members 26, which are disposed on the inside surface of the box beneath and abutting ledge member 22. Rib members 26 add substantial support to the ledge 22 and enable a cover member 32 (hereinafter described) to support great weight and thereby protect the contents of the box. The box 10 also has a second outwardly extending ledge 28 adjacent to the bottom thereof. Ledge 28 forms additional support for the meter box and prevents damage to the box because of poor distribution of the load. Ledge 28, which is a continuation of each of the side members of the box 10, is also buttressed against the side members by a plurality of lower supporting ribs 30.

Such a box has particular utility to house and protect a pipe meter and the like. It is therefore equipped with sections 55 adjacent to the lower ledge 21 on the first side 12 and the second side 16 of the box 10. Sections 55 are disposed beneath openings 56 and are removable such that openings 56 may be disposed about the pipe with the meter positioned within the box (see FIG. 3).

Disposed on the bottom of ledged member 28 are a plurality of downwardly extending coupling dogs 58 and associated openings or slots 61. (See FIGS. 1 & 4). Such dogs 58 and slots 61 are arranged and configured such that an equivalently shaped meter box may be inverted and coupled to ledge 28 (adjacent the boom 21 of box 10) whereby the dogs on the inverted meter box are disposed in the associated slots 61 on the upper meter box and the dogs 58 on the upper meter box are disposed in the slots on the inverted lower meter box. In such a configuration, with the bottom ledge 28 of two such meter boxes joined together, the effective volume of such a configuration is twice that of one meter box alone. Thus, it is within the scope of this invention, to couple two such meter boxes together whereby meters or other valuable contents may be stored and protected within the meter box without the need for making various different size boxes, i.e., by making one meter box which can be coupled together, economies of scale are achieved by producing one size box which can be selectively joined to another.

Box 10 also has keying slots 70 adjacent the top 19 thereof. Slots 70 are arranged and configured so as to help lock the box 10 in concrete or other similar material. In the preferred embodiments, slots 70 have opposed openings 72 which permit concrete to enter the box 10 and then harden, further locking the box 10 in position.

In the presently preferred embodiment, sides 12, 14, 16 and 18 are tapered such that the bottom 21 and bottom ledge 28 is larger than the top 19 and top rim 24, i.e., each of the sides tapers upward and towards the center of the top of the meter box 10. This tapering has the added advantage of preventing the box from being easily removed from the ground or from concrete once cast in place. It is to be understood, however, that other configurations of the box and sides are also within the scope of this invention. For example, the meter box can have a generally tubular shape and can be tapered whereby the top of the meter box is larger than the bottom of the meter box such that after it is disposed in the ground, the meter box would be easily removable therefrom. In the presently preferred embodiment, such a meter box is made of polyethylene, polypropylene, ABS, and other similar rigid plastic materials, with or without various reinforcing fillers.

Also shown in FIG. 1 is the cover 32. Cover 32 has a first section 35 and a second section 36, each rotatably coupled to each other by a pin 38. The cover 32 has a downwardly extending peripheral flange member 46 which completely encircles the cover and is arranged and configured such that when the cover is disposed on ledge 22, the bottom of flange 46 rests on ledge 22 and abuts rim 24 thus closing off the top end 19 of the box 10. Note that first section 35 of the cover 32 has a plurality of outwardly extending protrusions 45 which are selectively disposed in the first end 12 of the meter box 10 as hereinafter described. Second Section 36 of the cover 32 has an opening 60 disposed at the end thereof which abuts second end 16 of the box 10. Opening 60 permits Section 36 to be selectively opened and closed whereby access may be gained to the box.

Figure 2:
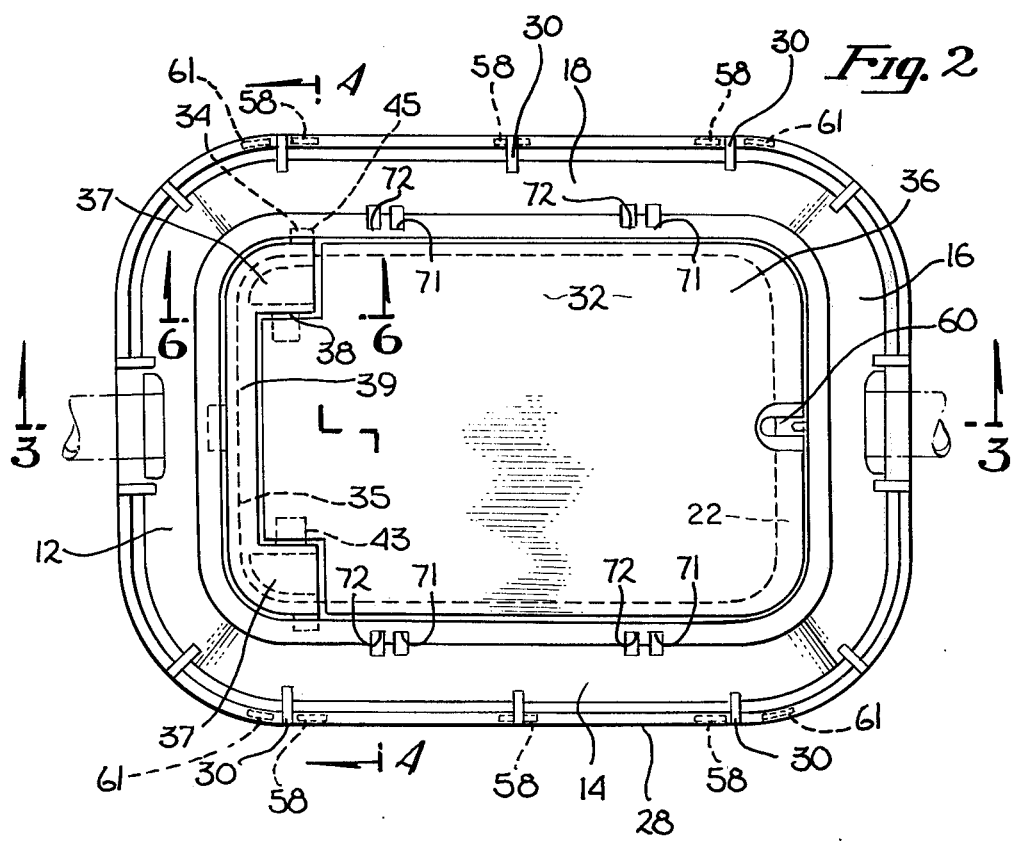
FIG. 2 is a top perspective view of the meter box and cover showing the first and second sections of the meter box and the means for rotatably joining these sections together.

Referring now to FIG. 2, the cover 32 has been disposed on the open top end 19 of the box 10. The flexible protrusions or flanges 45 are selectively engaged in associated slots 34. In the presently preferred embodiment, three such protrusions 45 and associated slots are disposed on the first section 35 of the cover 32, and the first end 12 of the meter box 10. By providing the cover and box with this plurality of interlocking means, the first section 35 is securely coupled to the box 10. In the covers of the prior art, usually only one such interlocking means was disposed on one end of the cover. Because the present invention uses a plurality, and in the preferred embodiment three, the cover 10 of the present invention is more securely coupled to the box 10 than the prior art and presents the first section 35 from being easily removed from the box 10.

The first section of 35 of the cover 32 has a generally U shaped appearance with two substantially parallel and spaced apart sections 37, joined by an elongated leg member 39. Note that in the presently preferred embodiment, one protrusion extends outwardly from each of the sections 37 and one extends outwardly from leg 39. Of course, it is to be understood, that other means to couple the cover 32 to the box 10 are within the scope of this invention. In addition, other configurations for the protrusions 45 as well as the entire cover 32 may also be utilized. For example, cover 32 may have a generally circular (rather than rectangular) shape.

The means used to rotatably join the first section 35 with the second section 36 of the cover 32 is more clearly seen with reference to FIGS. 2, 4 and 6. In the presently preferred embodiment, pin means 38 is used to couple these two aforementioned sections together. Pin 38 generally has a semi-circular cross section as shown in FIG. 6. Pin 38 is preferably made as a continuous element of first section 35 extending inward from each of the sections 37. A generally rectangular piece 41 is disposed beneath the pin 38 such that the pin cannot proceed downward out of the pin acceptor area 43 disposed in the second section 35 adjacent to pin 38. Note, however, that in the preferred embodiment such inter-connection means is generally loose fitting. This is most clearly shown in FIGS. 3 and 6. Because the first section 35 is secured to the box 10, only the second section 36 is rotatable. The second section 35, however, can be rotated in a generally upward direction to an over-center position whereby the top 32 (specifically section 36) remains open without the necessity of constantly holding it in the open position. As is shown in FIG. 6, when in the over-center position, the end 35 of the second section 35, which is adjacent section 35 is disposed generally forward such that second section 36 is angled backward and against the first section 35 in a self-supporting configuration.

In using the meter box of the present invention, a hole is first dug in the ground, exposing the pipe or other object which one desires to protect by the instant meter box 10 and associated cover 32. The box 10 is disposed in the ground over the desired object, and the cover 32 is disposed atop the meter box. This is done by first aligning protrusion 45 on leg 39 with its associated slot. Next, protrusions 45 disposed on sections 37 are flexed in a generally inward direction and inserted into their associated slots 45 on the first end 12 of the meter box 10. The inter-connected structure is most clearly shown with reference to FIG. 2. Once first section 35 is in place, each of the protrusions 45 on sections 37 will spring outward and be selectively engaged in associated slots 34. After first section 35 is in place, the second section 45 may be selectively opened and closed. When in a closed position a protrusion 59 disposed adjacent the second end 16 of the meter box 10 engages the second section 35 so as to selectively couple the second section 36 to the meter box 10. Of course, other means for coupling second section 36 to the box 10 are within the scope of this invention.

Referring now to FIGS. 3 and 5, one can see that in the presently preferred embodiment, protrusion 59 is engaged by a flange section 46a of the downwardly extending flange 46. More specifically, this section 46a is coupled to supporting ribs 75. Supporting ribs 75 are coupled to the underneath surface of the top cover 32 and provide the cover 32 with additional support. In the presently preferred embodiment, ribs 75 are joined so as to form generally rectangular sections. Flange section 46a has an opening 60 disposed therein which is arranged and configured such that protuberances 62 and 64 on the ribs 75 are disposed adjacent to protrusion 59. One desires to close the meter box, the protrusion 59 proceeds up opening 60 until it engages protuberances 62 and 64. These are then flexed outward and spring back in position with the pin disposed in area 66. In this position the cover 32, and specifically the second section 36, is in the closed position thus closing off the top 19 of the box 10. When one desires to open the meter box cover 32, no special tools or equipment are needed. Referring to FIG. 2, one can see that opening 60 proceeds a predetermined distance down the top of the second section 35 of cover 32. One need only extend a lifting tool, such as, for example, a screw driver and the like, into hole 60 and underneath the cover 32 and lift in a generally upward direction thereby causing protrusion 59 to flex section 62 and 65 outwardly, and thereby disengage protrusion 59 from engagement with ribs 75. The selective opening and closing of box 10 has now been described. Specific advantages of the uniquely designed means to couple the first section 35 and the second section 36 to the box 10 are apparent. For example, outward extending slots 34 and protrusions 45 disposed on the first section 35 of the cover 32 represent a simple, yet unique solution to the problem of securing a cover to a meter box, whereby the cover can be selectively opened and closed, thereby exposing the contents of the box, but without necessitating the complete removal of the cover.

Thus, the problems associated with the prior arts are effectively and inexpensively solved by the uniquely designed cover and associated box of the instant invention. Other unique features of the instant invention, such as, for example, the dog members 58 and interlocking slot 61 represent further advantages of the present invention over the prior art. Moreover, because of the tapering of the wall of the instant invention, the boxes are nestable, one within the other, which thus enable the boxes of the instant invention to be stacked one atop the other so as to take up substantially less room in storage and shipping, compared with prior art boxes. This further reduces costs.

There has been described herein a new and novel meter box and associated cover which provides in ground protection for pipes and pipe related objects. However, it is to be understood that various alternative embodiments using the principles of the present invention may readily be incorporated. For example, the dog members 58 may be removed, and a wide variety of shapes and sizes of the box and cover may also be used. Instead of using the general rectangular flange protrusions 45, other means for joining the first section 35 to the first end 12 of the cover are also within the scope of this invention. Thus, while one specific embodiment of the present invention has been disclosed and described in detail herein, it will be understood by those skilled in the art that various changes in form and detail may be made herein without departing from the spirit and scope of the invention.

I claim:
1. A meter box assembly comprising:
   a. a meter box having an open upper top with an upwardly extending rim member terminating on the inside surface of said box near the top thereof in an inwardly extending ledge member; and
   b. a cover arranged and configured so as to rest on said ledge member and confront said rim on said box, said cover comprising first and second sections and means for rotatably joining said first and second sections together, said first section having means for engaging said meter box so as to render said fist section substantially immovable therein, said second section having means for lifting said second section and moving said second section about said means rotatably joining said first and said second sections together whereby said meter box is selectively opened and closed.

2. The meter box according to claim 1 wherein said box has a plurality of rib members on said inside surface of said box disposed beneath and abutting said ledge members.

3. The meter box according to claim 1 wherein said box has an outwardly extending horizontal ledge member along the bottom thereof.

4. The meter box according to claim 1 wherein said box has means for selective engaging said second section of said cover disposed on said inside surface of said box above said ledge member such that said second section is selectively coupled to said box.

5. The meter box according to claim 1 wherein said means for engaging said meter box on said first section are outwardly extending protrusions.

6. The meter box according to claim 1 wherein said means for rotatably joining said first and second sections together comprises pin means.

7. A meter box according to claim 1 wherein said cover includes a downwardly extending peripheral flange member which rests on said ledge member of said meter box.

8. A meter box assembly comprising:
   a. a meter box having first and second ends and an open upper top with an upwardly extending rim member terminating on the inside surface thereof in an inwardly extending ledge member, said meter box having a plurality of slots disposed on the side inside surface above said ledge member adjacent said first end thereof; and
   b. a cover having a downwardly extending flange member arranged and configured so as to rest on said ledge member and confront said rim on said box, said cover comprising first and second sections and a pin means for rotatably joining said first and second sections together, said first section being coupled to said first end of said meter box by a plurality of protrusions yieldably engaged in said slots so as to render said first section immovable therein, said second section being coupled to said second end of said box and having means for lifting said second section off of said meter box and moving it about said pin means whereby said meter box is selectively opened and closed.

9. The meter box according to claim 8 wherein said means for lifting said second section is a tool opening disposed through said second section adjacent said second end of said meter box, said tool opening arranged and configured such that a lifting tool is insertable therein.

10. The meter box according to claim 9 wherein said second end of said meter box has means for selectively engaging said second section of said cover, said means for selectively engaging said second disposed adjacent said shaped opening.

11. The meter box according to claim 8 wherein said cover has a downwardly extending peripheral flange which rests on said ledge member of said meter box, and wherein said means for lifting said second section is a tool opening disposed through said second section and said peripheral flange so as to confront said second end of said meter box, said tool opening arranged and configured such that a lifting tool is insertable therein.

12. The meter box according to claim 12 wherein said peripheral flange on said cover has grip means disposed adjacent said tool opening, said grip means selectively coupling said second section of said cover to said meter box.

13. The meter box according to claim 9 wherein a plurality of downward extending legs and a plurality of associated openings are disposed adjacent the bottom of said meter box.

* * * * *